(12) United States Patent
Blum

(10) Patent No.: US 8,081,951 B1
(45) Date of Patent: Dec. 20, 2011

(54) EMERGENCY CELLULAR TELEPHONE SYSTEM

(76) Inventor: Alvin S. Blum, Fort Lauderdale, FL (US)

( * ) Notice: Subject to any disclaimer, the term of this patent is extended or adjusted under 35 U.S.C. 154(b) by 0 days.

(21) Appl. No.: 12/931,373

(22) Filed: Feb. 1, 2011

(51) Int. Cl.
*H04M 11/04* (2006.01)

(52) U.S. Cl. .............. 455/404.1; 455/414.1; 340/539.12

(58) Field of Classification Search .............. 340/539.12; 455/404.1, 414.1
See application file for complete search history.

(56) References Cited

U.S. PATENT DOCUMENTS

| | | |
|---|---|---|
| 4,878,236 A | 10/1989 | Ray |
| 4,993,058 A | 2/1991 | McMinn |
| 5,305,370 A | 4/1994 | Kearns |
| 5,491,745 A | 2/1996 | Roeder |
| 5,710,803 A | 1/1998 | Kowal et al. |
| 5,748,706 A | 5/1998 | Morgan |
| 5,790,019 A | 8/1998 | Edwin |
| 5,960,061 A | 9/1999 | Fahie |
| 6,114,948 A | 9/2000 | Astell |
| 6,115,597 A * | 9/2000 | Kroll et al. ................. 455/404.1 |
| 6,173,169 B1 | 1/2001 | Oh |
| 6,205,203 B1 | 3/2001 | Gorman |
| 6,307,920 B1 | 10/2001 | Thomson |
| 6,597,924 B1 | 7/2003 | Smith |
| 6,870,906 B2 | 3/2005 | Dawson |
| 7,012,544 B2 | 3/2006 | Cunningham |
| 7,203,307 B1 | 4/2007 | Suchiro |
| 7,231,200 B2 | 6/2007 | Jenkins |
| 7,355,507 B2 | 4/2008 | Binning |
| 7,557,704 B2 | 7/2009 | DeBaugh |
| 2004/0266390 A1* | 12/2004 | Faucher et al. ............ 455/404.1 |
| 2006/0079269 A1* | 4/2006 | Sorotzkin ................. 455/550.1 |
| 2009/0054027 A1* | 2/2009 | Jenkins ..................... 455/404.1 |
| 2010/0194631 A1* | 8/2010 | Janetis et al. ............. 342/357.1 |

\* cited by examiner

*Primary Examiner* — Olumide T Ajibade Akonai
*Assistant Examiner* — Jaime Holliday
(74) *Attorney, Agent, or Firm* — Alvin S. Blum

(57) ABSTRACT

A telephone system includes a user-carried emergency communication system in combination with a cellular telephone. The user-carried handset has a large button on a first face. Pressing the button summons help by automatic connection to the 911 emergency telephone network. It also activates a signaling device mounted on the inside glass surface of a window that illuminates a message that 911 has been called. It may also sound an alarm. A pre-recorded massage may also be sent to the emergency call center. The other face has the functions of a cellular telephone. All elements are within the building, with installation by simply plugging cords into power outlets the same as any cellular phone and mounting the signaling device with suction cups. There are no monthly fees except for the usual cellular phone fee.

5 Claims, 4 Drawing Sheets

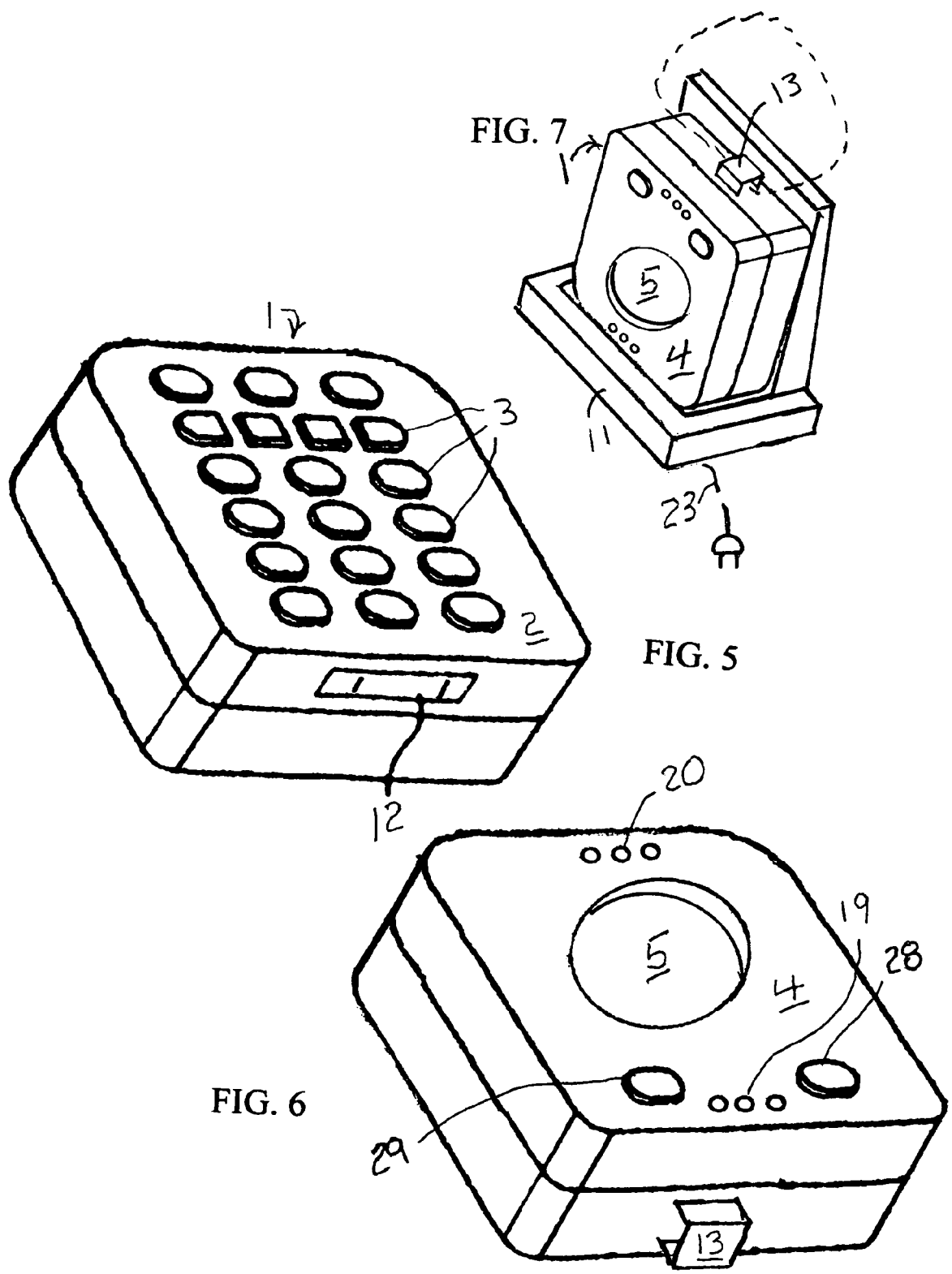

EMERGENCY CELLULAR TELEPHONE SYSTEM

BACKGROUND OF THE INVENTION

The present invention relates generally to a telephone system, and more particularly to a cellular telephone system that provides both conventional cellular telephone operation as well as a special emergency telephone operation. The current emergency service system in operation throughout this country is the 911 emergency service provided by the telephone system. The system has the ability to locate any residence from which a landline telephone call to the 911 number is made. Cellular telephones do not have this feature, although the 911 system may be able to triangulate the call emissions to determine the present location of the caller. Many individuals may find themselves alone in a location that is equipped with only a cellular telephone. If they are incapacitated, they may dial 911 for assistance. They may not be able to tell the 911 operator their exact location when they are at home. Even when a call is successful and responders reach the address given them, they may not be sure of which door leads to the caller, such as in an apartment building. If no one answers, they may be reluctant to break in, and they may leave without rendering any assistance.

Cellular telephones of the prior art have a rechargeable battery that is periodically recharged by a recharging unit connected to a house power outlet.

McMinn et al., in U.S. Pat. No. 4,993,058 issued Feb. 12, 1991 disclose an emergency signaling system that includes a lighted house number and strobe light on the outside of the house connected by wires to a control box within the house, presumably through one or more holes in the building. The control box senses dialing the emergency number and is connected to the phone line and also a power outlet.

Commercial services provide a panic button that is a limited function cellular telephone to be worn by an individual as a pendant. The button is pushed in an emergency. This telephones the service provider who then notifies an emergency system to send help, giving the location to which help is to be sent. There is a considerable monthly charge for this service. It does not solve the problem of no one answering a knock on the door. Most in need of this service are the elderly who may not have the funds for this service, and may need help for any installation beyond simple plug in. If they are renters, they may not be permitted to make changes such as holes through the wall. Even when the responders reach the address given them, they may not be sure of which door leads to the caller, such as in an apartment building. If no one answers, they may be reluctant to break in, and they may leave without rendering any assistance.

SUMMARY OF THE INVENTION

This invention provides both a conventional cellular telephone operating system as well as a special emergency telephone operation along with means for alerting those outside a building that an emergency call has been made from within the building. It requires neither special installation nor monthly expenditure outside of the original cellular telephone service fees. A conventional cellular telephone or handset has one radio frequency connection. The handset contains a rechargeable battery that is periodically recharged in a separate charger connected to a house power outlet. A user in need of emergency help may call the emergency telephone number such as 911 and tell the operator the location of the caller and other information. The above is true of conventional cordless telephones. The handset of the invention has a first broad face with the usual features provided by a cellular telephone. In addition to the usual handset features, this one has a reverse side featuring a large emergency button that calls 911. The handset of this invention also has a second radio connection. It is a short range radio connection to an alerting device that attaches to the inside glass surface of a window with one or more suction cups. The alerting device is connected to an inside house power outlet. When the alerting device receives the short range radio frequency signal from actuation of the emergency button, it emits a light signal to the outside through the window indicating that an emergency call has been made from the premises. It may also provide an audible signal. The alerting device is mounted on the inside glass surface of a window preferably at the front of the premises. This enables the responders to more easily find the caller. The handset is designed to be compact so as to be conveniently carried or worn, for example, as a pendant around the neck or clipped to the clothes with the emergency button outermost. When an ordinary call comes in, the user need not rush to a phone, because it is at hand. This avoids injury from rushing to answer a call. In the event of a fall or emergency anywhere in the residence, the user need not travel to get help. The alerting device may be provided with another feature. When the alerting device receives a signal indicating that the emergency button has been actuated, it may send a signal back to the handset. This signal may actuate a recorded message that is sent out on the cellular network indicating the request for help, the location of the device, and other information such as, "I have diabetes. My neighbor at apartment 203 has a key". If the user is unable to speak, the recorded message will suffice. Since this message will not be given when the handset is beyond the range of the short range radio signal and the premises, there is no danger of confusing the responders by having them go to a vacant location. The recharge station is best provided at the bedside to provide the handset at hand while in bed, and to ensure regular recharging.

These and other objects and advantages will appear from the following description of an illustrative embodiment of the present invention.

BRIEF DESCRIPTION OF THE DRAWINGS

FIG. 5 is a perspective view of the first face of a handset of the invention.

FIG. 6 is a perspective view of the second face of a handset of the invention ready for making an emergency call.

FIG. 7 is a perspective view of the second face of a handset of the invention mounted in a base unit for charging.

DETAILED DESCRIPTION OF PREFERRED EMBODIMENTS

This invention now will be described more fully hereinafter with reference to the accompanying drawing, in which exemplary embodiments are shown. This invention may, however, be embodied in many different forms and should not be construed as limited to the embodiments set forth here. Rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future.

Figure 1:
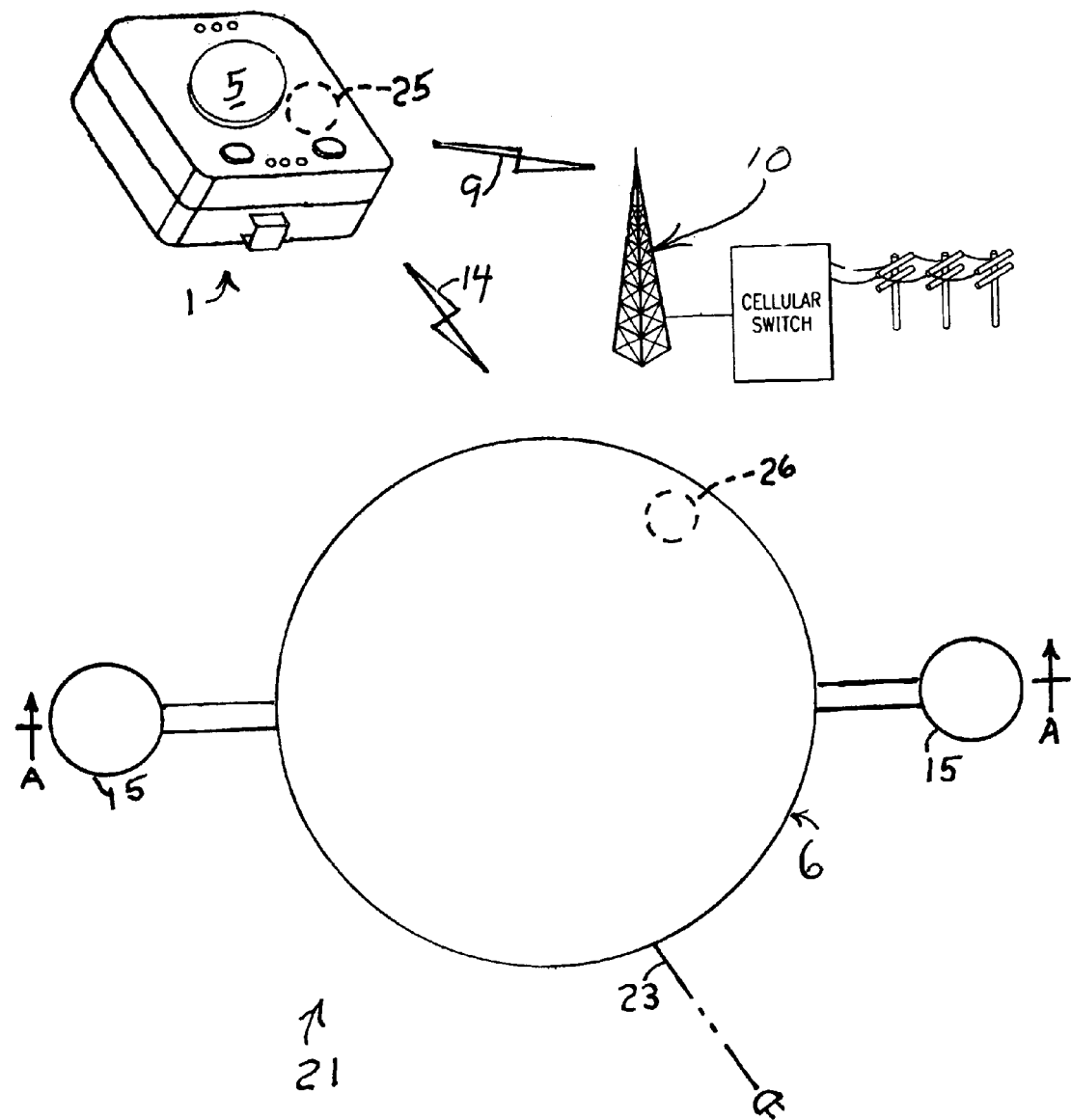
FIG. 1 is a diagram of a cellar telephone system of the invention.
Figure 2:
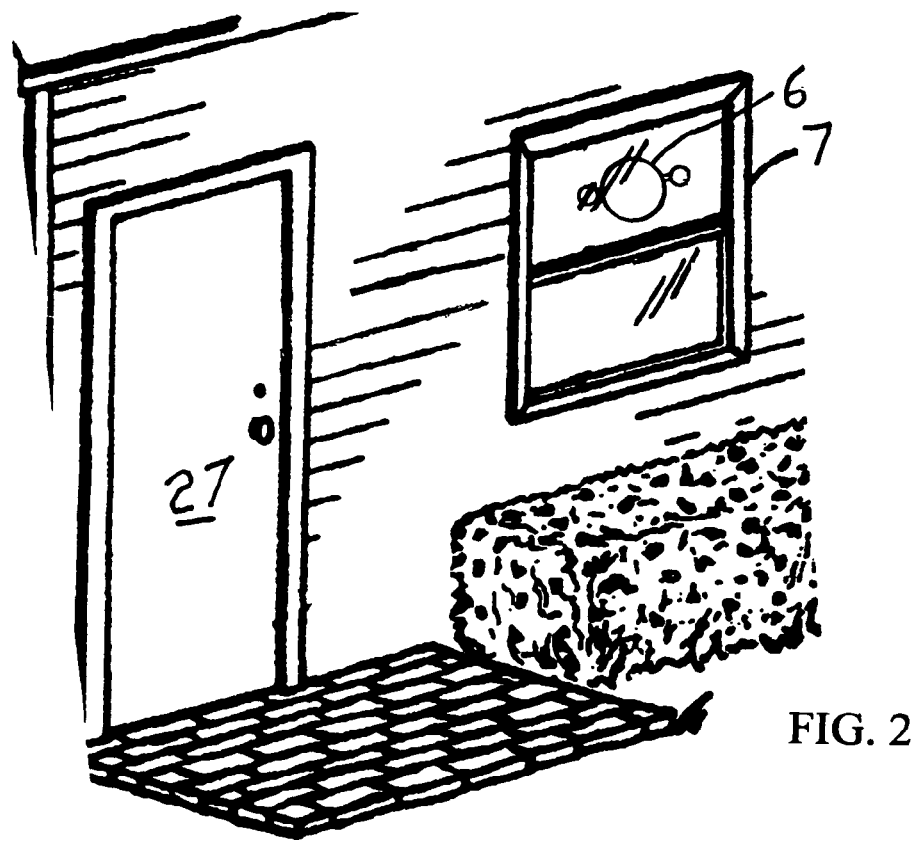
FIG. 2 is a fragmentary pictorial view illustrating an inactive signaling device of the invention visible while mounted on the inside surface of a window of a user adjacent an entry-way.
Figure 3:
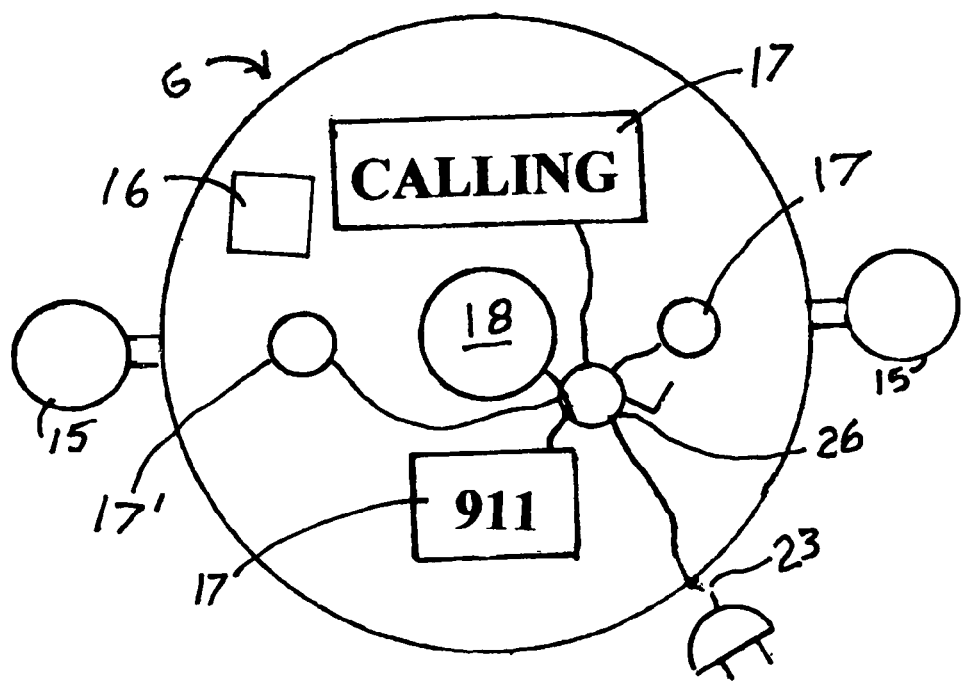
FIG. 3 is a diagrammatic view of the active signaling device as viewed through the window.
Figure 4:
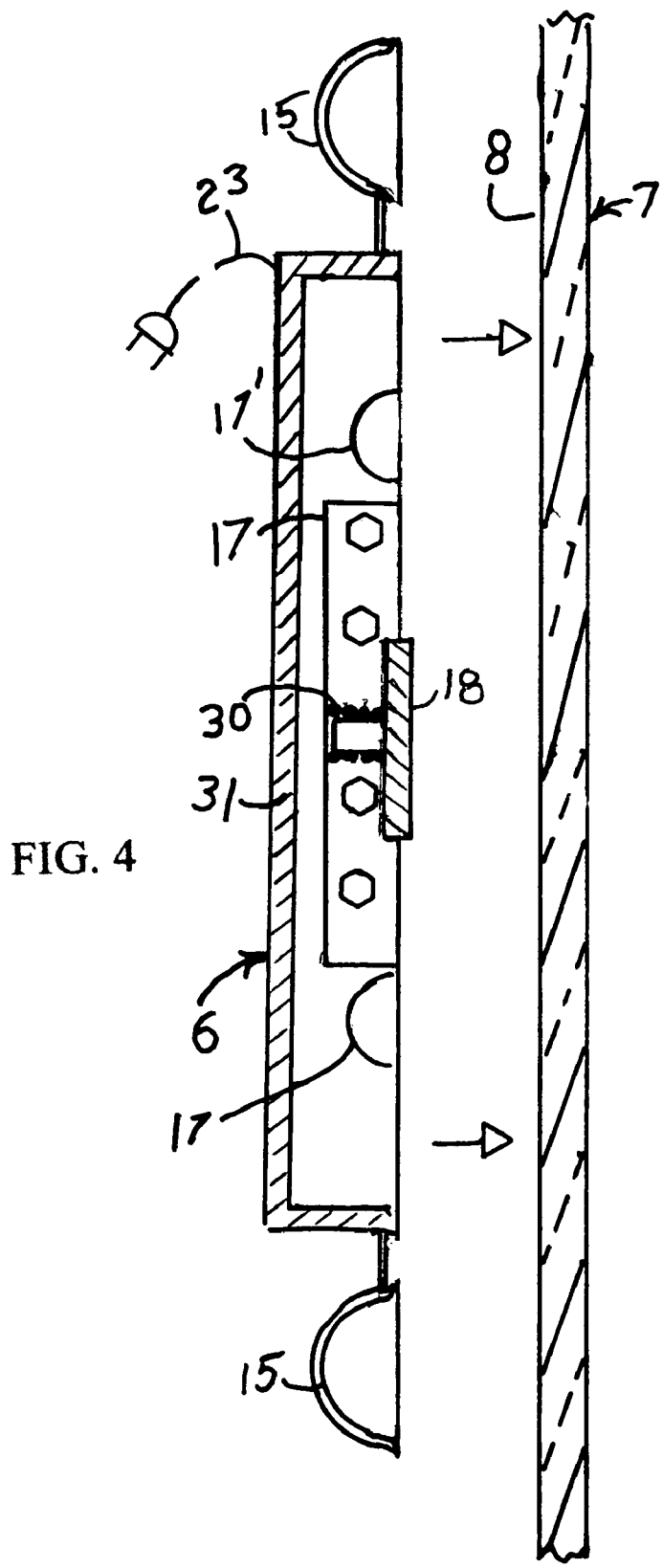
FIG. 4 is a sectional view of the signaling device taken through line A-A of FIG. 1.

Referring now to the drawing FIGS. 1-7, an emergency cellular telephone system 21 of the invention, as shown diagrammatically in FIG. 1, comprises a remote cellular network 10, a handset 1, and a signaling device 6. The handset 1 has a transceiver 25 that communicates with a transceiver 26 in the signaling device by short range radio waves 14 on a bandwidth assigned by the FCC for this purpose. A recharging station 11, has a connection 23 to a house power outlet.

The handset 1 has a first broad face 2 provided with a keypad 3 to enable the handset to perform the calling function of handsets of the prior cellular art through the long range radio waves 9 currently used for cellular communication. A second, opposed broad face 4 is provided with a large, readily accessible emergency call button 5. The button may be recessed or provided with other means to prevent inadvertent actuation, such as, for example, but not limited to, a cover, a time control to only actuate if the button is depressed for a preset time period, and the like. A cancel button 28 may be provided to cancel an emergency call. A microphone 19 and speaker 20 and a talk button 29 may all be available to a user of the second face. A connecting means 13 is provided so that the handset may be worn by the user as a pendant, fastened to the clothing, or with a wrist band with the second face outermost. When a call comes in, the user need only press the talk button to commence a conversation. If the user should fall or encounter some other emergency, they need only press the emergency button to be connected to the 911 operator.

The signaling device 6, as seen in FIG. 1, is best mounted by suction cups on the inside glass surface 8 of a window 7 on the same side of the building as an entryway 27. Device 6 is powered by power connector 23 to house power. It remains inactive until activated by the generation of a call to the emergency number. The call to the emergency number will cause a signal 14 to be emitted from the handset 1 that will be received by transceiver 26 in the signaling device 6 that will cause the message "calling 911" to be illuminated at lighting boxes 17, Also strobe lights 17' may be operated to get the attention of responders, if desired. The device may also be provided with a sound generator 18 that is pressed against the glass to attract attention. Sound generator 18 may be pressed against the glass by spring 30 so that the sound will be better heard outside, and sound absorbing materials 31 may reduce the sound indoors. The cancel button 28 on the handset may be used to inactivate the signaling device. A pre recorded message facility 16 may be mounted in the signaling device for actuation when a 911 call is made to deliver a prerecorded massage to the responder via the handset. If the person making the emergency call is not on the premises, the short range signal 14 will not reach the signaling device 6. The device 6 will not activate, and the pre-recorded message will not be sent. This prevents misdirecting responders, and others nearby. A recharging station 11 has a connection 23 to a house power outlet. The station 11 connects to the rechargeable handset battery 12. The recharging station is adapted to present the second face 4 with the emergency button 5 exposed while charging so that it may be positioned at the bedside for easy access while the user is in bed. This also ensures that the battery will be recharged daily before being worn.

Many phones also include a visual display for caller ID use. Some also include message recording features. One or all of these additional features may optionally be incorporated into the instant invention. They may be omitted in the interest of making the handset more easily carried. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A cellular telephone system comprising:
a) a handset having a first broad face provided with a keypad adapted to perform cellular telephone handset functions including communication by long range radio waves with a cellular telephone network, and a second opposed broad face provided with an emergency call button, and access to a microphone, and a speaker;
b) a recharging station adapted to receive the handset for recharging while exposing the emergency call button during charging;
c) a light and sound emitting signaling device indicating by illumination of a message and one or more audible signals announcing that the emergency number has been called when activated, the device powered by power connector to inside electric power and having at least one suction cup for attaching to an inside glass surface of a window, the device adapted to make the illuminated message visible from outside the window and the one or more audible signals audible from outside the window;
d) the handset having a rechargeable battery and adapted to be carried or worn by a user;
e) the signaling device and the handset provided with means for the reception and transmission of signals there between with short range radio waves;
f) means for generating a special signal from actuation of the emergency call button and for responding to that signal by calling the emergency telephone number on the cellular telephone network by long range radio waves, and to send short range radio waves to activate the signaling device;
g) a pre-recorded message facility for storing an audible message and for transmission of the audible message to the emergency system when connection to the emergency system has been established by actuation of the emergency button only when the handset is within range of the signaling device as determined by the range of the short range radio waves; and
h) means for deactivating the signaling device as desired.

2. A cellular telephone system comprising:
a) a handset having a first broad face provided with a keypad adapted to perform cellular telephone handset functions including communication by long range radio waves with a cellular telephone network, and a second opposed broad face provided with an emergency call button;
b) a light emitting signaling device indicating by illumination of a message that the emergency number has been called when activated, the device powered by power connector to inside electric power and having means for attaching to an inside glass surface of a window, the device adapted to make the message visible from outside the window;
c) a recharging station adapted to receive the handset for recharging while exposing the emergency call button of the handset during charging;

d) the handset having a rechargeable battery and adapted to be worn or carried by a user;

e) the handset and the signaling device provided with means for the reception and transmission of signals there between with short range radio waves;

f) means for generating a special signal from actuation of the emergency call button and for responding to that signal by connecting the handset to an emergency telephone number on the telephone network with the long range radio waves, and to activate the signaling device with the short range radio waves when the signaling device is within range as determined by the range of the short range radio waves; and g) means for deactivating the signaling device as desired.

3. The cellular telephone system of claim 2 in which the attaching means comprises at least one suction cup.

4. The cellular telephone system of claim 2 further comprising a pre-recorded message facility for storing an audible message and for transmission of the audible message to the emergency system after connection to the emergency system has been established by actuation of the emergency button when the handset is within range of the signaling device.

5. The cellular telephone system of claim 2 further comprising a sound emitting element on the signaling device that is adapted to be pressed against the inside glass surface, the device adapted to make the emitted sound audible outside the window when the device is activated.

* * * * *